(12) United States Patent
Kajikiya et al.

(10) Patent No.: US 12,081,037 B2
(45) Date of Patent: Sep. 3, 2024

(54) ANTENNA MODULE AND WIRELESS POWER TRANSMISSION DEVICE HAVING THE SAME

(71) Applicant: TDK Corporation, Tokyo (JP)

(72) Inventors: Shoma Kajikiya, Tokyo (JP); Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 15 days.

(21) Appl. No.: 18/173,304

(22) Filed: Feb. 23, 2023

(65) Prior Publication Data

US 2023/0283112 A1    Sep. 7, 2023

(30) Foreign Application Priority Data

Mar. 1, 2022 (JP) .................................. 2022-031038

(51) Int. Cl.
*H02J 50/70*    (2016.01)
*H01F 27/28*    (2006.01)
*H02J 50/12*    (2016.01)

(52) U.S. Cl.
CPC .......... *H02J 50/12* (2016.02); *H01F 27/2804* (2013.01); *H01F 2027/2809* (2013.01)

(58) Field of Classification Search
CPC .................................................... H02J 50/12
See application file for complete search history.

(56) References Cited

U.S. PATENT DOCUMENTS

| | | | |
|---|---|---|---|
| 11,750,034 B2* | 9/2023 | Woronowicz | B60L 53/122 307/10.1 |
| 2015/0280322 A1 | 10/2015 | Saito et al. | |
| 2015/0333389 A1 | 11/2015 | Orihara et al. | |
| 2016/0372961 A1* | 12/2016 | Ritter | H02J 7/0044 |
| 2018/0090999 A1* | 3/2018 | Graham | H04B 5/24 |
| 2018/0233961 A1* | 8/2018 | Hu | H01F 38/14 |
| 2019/0199137 A1* | 6/2019 | Jiang | H04B 5/43 |
| 2023/0216341 A1* | 7/2023 | Alam | H01Q 1/36 307/104 |

FOREIGN PATENT DOCUMENTS

| | | |
|---|---|---|
| JP | 2003-332820 A | 11/2003 |
| WO | 2014/077098 A1 | 5/2014 |
| WO | 2014/097783 A1 | 6/2014 |

* cited by examiner

*Primary Examiner* — Jared Fureman
*Assistant Examiner* — Esayas G Yeshaw
(74) *Attorney, Agent, or Firm* — Rimon P.C.

(57) ABSTRACT

Disclosed herein is an antenna module sheet that includes a first coil pattern including first to third turns. The first turn is positioned in an opening of the second turn, and the second turn is positioned in an opening of the third turn. Each of the first and second turns has an opening width larger in a first direction than in a second direction. The first distance between the first and second turns in the second direction is smaller than the second distance between the second and third turns in the second direction. The third distance between the first and second turns in the first direction is smaller than the first distance. The fourth distance between the second and third turns in the first direction is smaller than the second distance. The third turn has an opening width larger in the second direction than in the first direction.

14 Claims, 12 Drawing Sheets

ANTENNA MODULE AND WIRELESS POWER TRANSMISSION DEVICE HAVING THE SAME

CROSS-REFERENCE TO RELATED APPLICATION

This application claims the benefit of Japanese Patent Application No. 2022-031038, filed on Mar. 1, 2022, the entire disclosure of which is incorporated by reference herein.

BACKGROUND

The present disclosure relates to an antenna module and a wireless power transmission device having the same.

International Publication WO 2014/077098 discloses a coil pattern having a pattern shape in which a ratio between the long side and the short side of one turn increase toward the inner peripheral side.

However, in the antenna module described in International Publication WO 2014/077098, there is a need to increase the number of turns in order to extend a communicable range, which disadvantageously increases a DC resistance to cause a change in impedance.

SUMMARY

An antenna module according to the present disclosure has a first coil pattern including at least first, second, and third turns. The first turn is positioned in the opening of the second turn, and the second turn is positioned in the opening of the third turn. The first and second turns each have an opening width larger in a first direction than in a second direction perpendicular to the first direction. A first distance between the first and second turns in the second direction is smaller than a second distance between the second and third turns in the second direction, a third distance between the first and second turns in the first direction is smaller than the first distance, and a fourth distance between the second and third turns in the first direction is smaller than the second distance. The third turn has an opening width larger in the second direction than in the first direction.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a schematic plan view, and FIG. 1B is a schematic cross-sectional view taken along the line A-A illustrated in FIG. 1A;

DETAILED DESCRIPTION OF THE EMBODIMENTS

An object of the present disclosure to provide an antenna module having a coil pattern achieving a wide communicable range in a predetermined direction while suppressing an increase in the number of turns.

Preferred embodiments of the present disclosure will be explained below in detail with reference to the accompanying drawings.

Figure 1A:
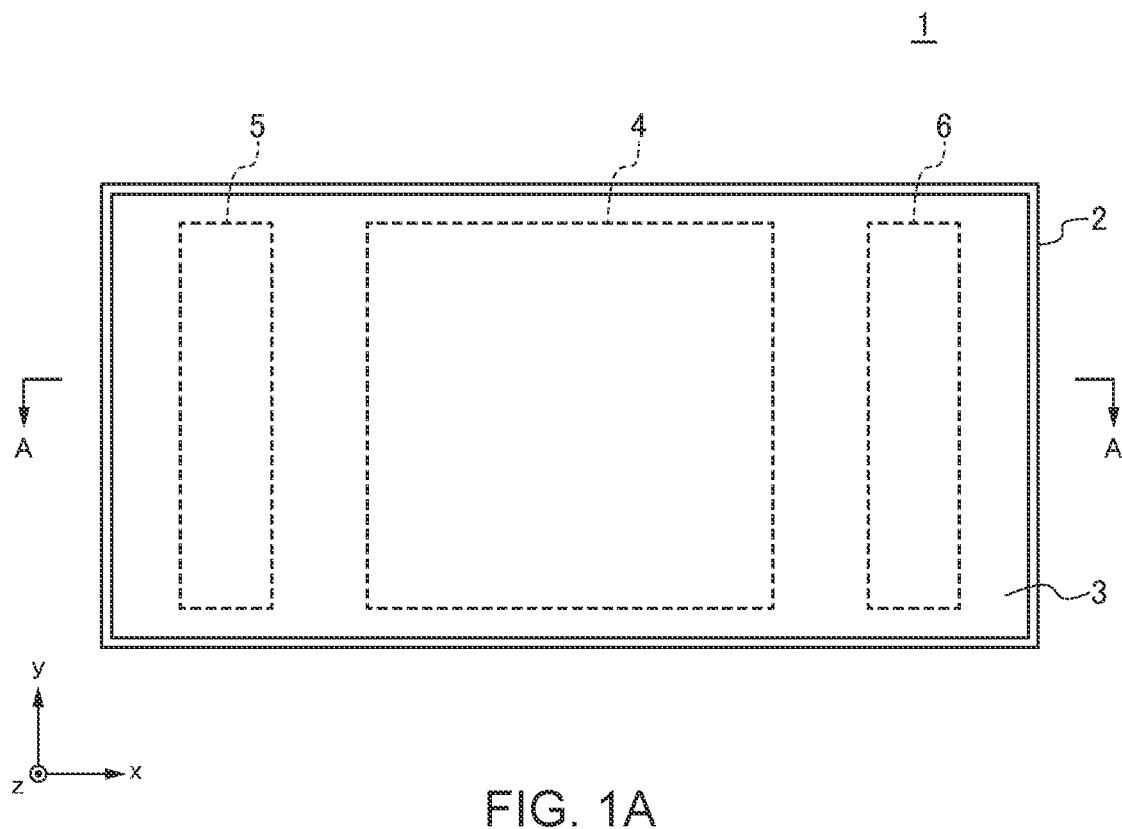
FIGS. 1A and 1B are schematic views for explaining the structure of an antenna module 1 according to one embodiment of the present disclosure, where
Figure 1B:
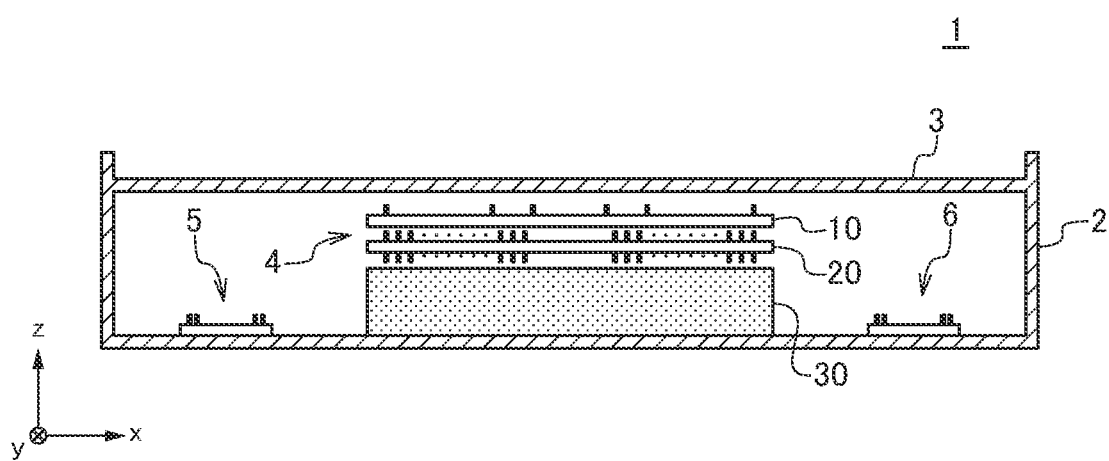

FIGS. 1A and 1B are schematic views for explaining the structure of an antenna module 1 according to one embodiment of the present disclosure. FIG. 1A is a schematic plan view, and FIG. 1B is a schematic cross-sectional view taken along the line A-A illustrated in FIG. 1A.

As illustrated in FIGS. 1A and 1B, the antenna module 1 according to the present embodiment includes a housing 2 having a placement surface 3 for placing thereon a mobile communication device such as a smartphone and wireless communication parts 4 to 6 each disposed in the inner space of the housing 2 so as to overlap the placement surface 3. The wireless communication part 4 is positioned at substantially the center of the housing 2 in the x-direction, the wireless communication part 5 is positioned at one side of the housing 2 in the negative x-direction, and the wireless communication part 6 is positioned at the other side of the housing 2 in the positive x-direction. The wireless communication parts 4 to 6 do not overlap one another in the z-direction. The wireless communication part 4 has a structure in which a first substrate 10, a second substrate 20, and a magnetic sheet 30 are stacked. As will be described later, the first substrate 10 has thereon an antenna coil for NFC (Near Field communication), and the second substrate 20 has thereon a power transmission coil for a wireless power transmission. Thus, the wireless communication part 4 has both a wireless communication function and a wireless power transmission function. On the other hand, the wireless communication parts 5 and 6 each only have a wireless communication function. Smartphones have various sizes from large to small sizes. Accordingly, the placement surface 3 of the antenna module 1 is designed to be wide so as to allow various sizes of smartphones to be placed thereon, so that the position of a smartphone placed on the placement surface 3 may shift in the x-direction of the placement surface 3. Further, when the antenna module 1 is provided in a console inside a vehicle, a smartphone placed on the placement surface may shift in position due to vibration of the vehicle. The antenna module 1 according to the present embodiment can perform wireless communication and wireless power transmission even when a smartphone placed on the placement surface 3 shifts in position.

Figure 2A:
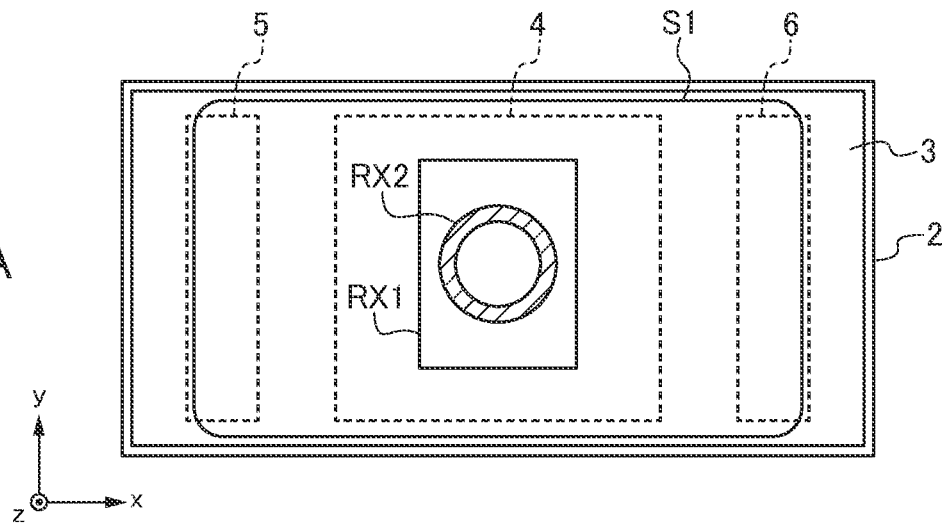
FIGS. 2A to 2C are schematic views illustrating a state where a smartphone S1 is placed on the placement surface 3 of the housing 2.
Figure 2B:
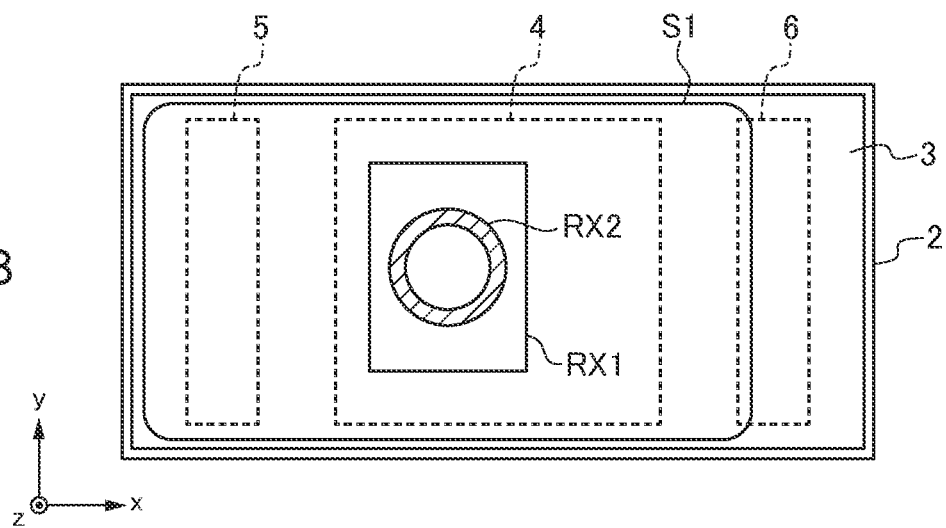
Figure 2C:
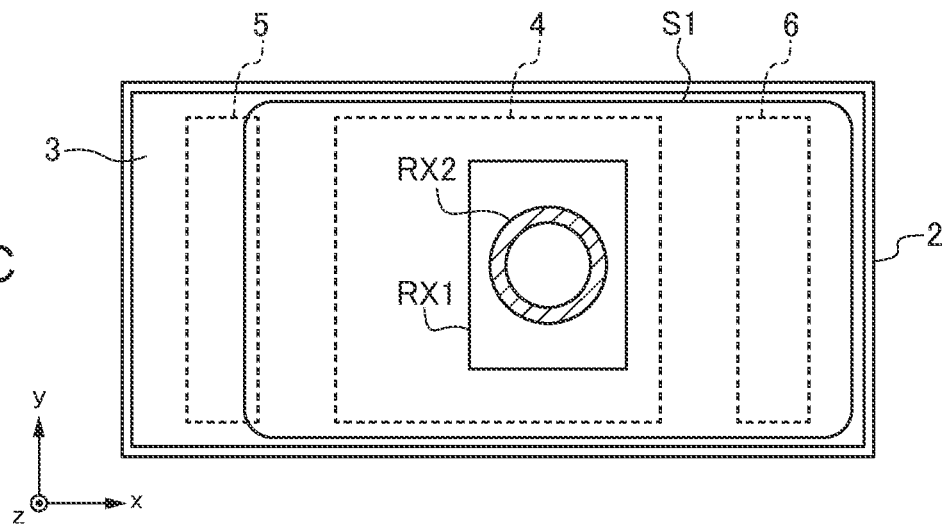

FIGS. 2A to 2C are schematic views illustrating a state where a smartphone S1 is placed on the placement surface 3 of the housing 2. FIG. 2A illustrates a state where the smartphone S1 is placed at substantially the center of the placement surface 3 in the x-direction, FIG. 2B illustrates a state where the smartphone S1 is placed offset to one side of the placement surface 3 in the negative x-direction, and FIG. 2C illustrates a state where the smartphone S1 is placed offset to the other side of the placement surface 3 in the positive x-direction.

The smartphone S1 illustrated in FIGS. 2A to 2C, which has a long side in the x-direction and a short side in the y-direction, includes an antenna coil RX1 for NFC and a power receiving coil RX2 for wireless power transmission which are disposed at substantially the center thereof in the x-direction. When the smartphone S1 of such a type is placed on the placement surface 3 of the housing 2, wireless communication and wireless power transmission can be performed using the wireless communication part 4 irrespective of the x-direction position of the smartphone S1 on the placement surface 3. In this case, the wireless communication parts 5 and 6 are not used. The positional relation between the wireless communication part 4 and the antenna and power receiving coils RX1 and RX2 of the smartphone S1 in the x-direction changes depending on the x-direction position of the smartphone S1 on the placement surface 3, so that the wireless communication part 4 is designed to provide a wide range of coupling with the antenna and power receiving coils RX1 and RX2 in the x-direction.

Figure 3A:
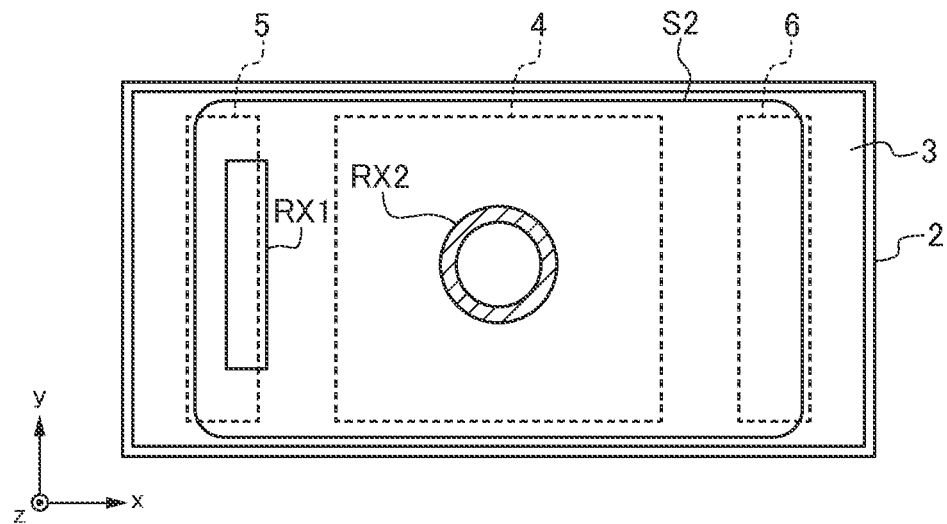
FIGS. 3A to 3C are schematic views illustrating a state where a smartphone S2 is placed on the placement surface 3 of the housing 2.
Figure 3B:
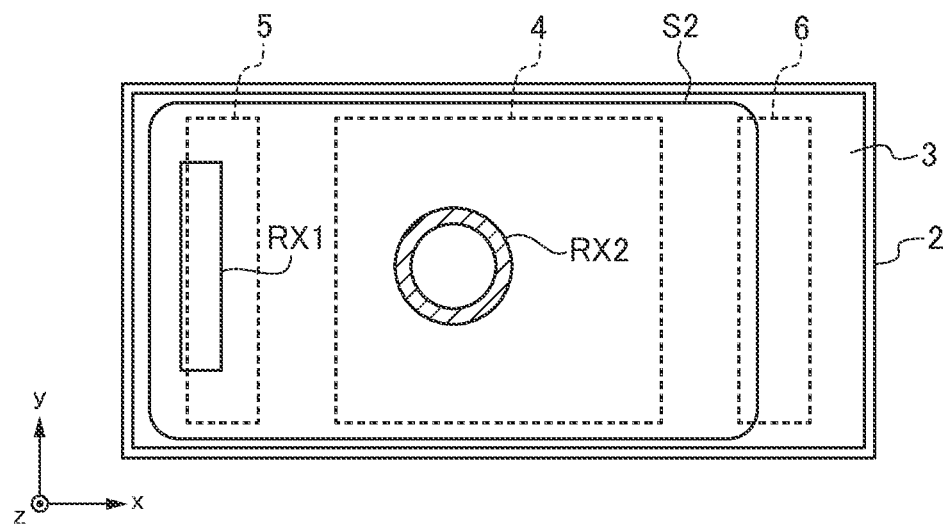
Figure 3C:
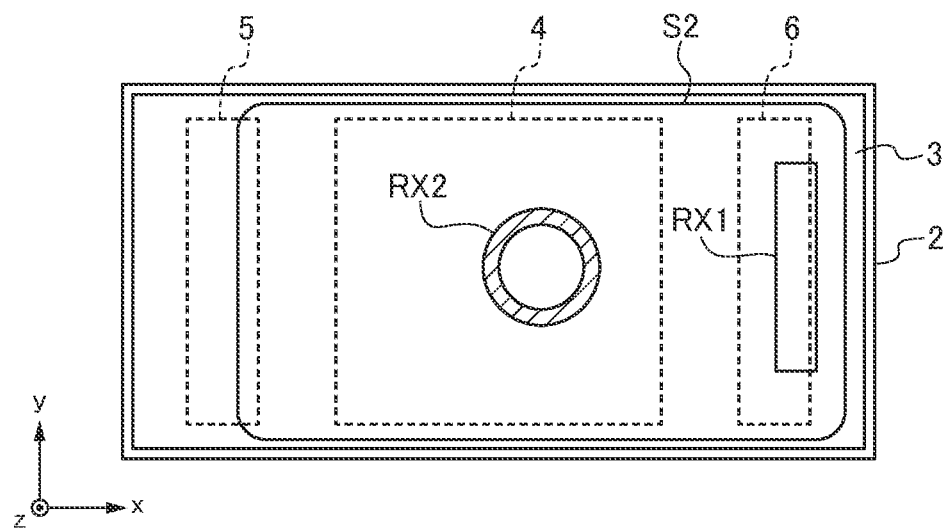

FIGS. 3A to 3C are schematic views illustrating a state where a smartphone S2 is placed on the placement surface 3 of the housing 2. FIG. 3A illustrates a state where the smartphone S2 is placed at substantially the center of the placement surface 3 in the x-direction, FIG. 3B illustrates a state where the smartphone S2 is placed offset to one side of the placement surface 3 in the negative x-direction, and FIG. 3C illustrates a state where the smartphone S2 is placed offset to the other side of the placement surface 3 in the positive x-direction.

The smartphone S2 illustrated in FIGS. 3A to 3C, which has a long side in the x-direction and a short side in the y-direction, includes the antenna coil RX1 for NFC disposed at one side thereof in the x-direction and the power receiving coil RX2 for wireless power transmission disposed at substantially the center thereof in the x-direction. When the smartphone S2 of such a type is placed on the placement surface 3 of the housing 2, wireless power transmission can be performed using the wireless communication part 4 irrespective of the x-direction position of the smartphone S2 on the placement surface 3. On the other hand, for wireless communication, when the smartphone S2 is placed on the placement surface 3 such that the antenna coil RX1 is disposed at the negative x-direction side (see FIGS. 3A and 3B), the wireless communication part 5 is used, while when the smartphone S2 is placed on the placement surface 3 such that the antenna coil RX1 is disposed at the positive x-direction side (see FIG. 3C), the wireless communication part 6 is used. As described above, either the wireless communication part 5 or 6 is used depending on the disposing direction of the smartphone S2.

Figure 4A:
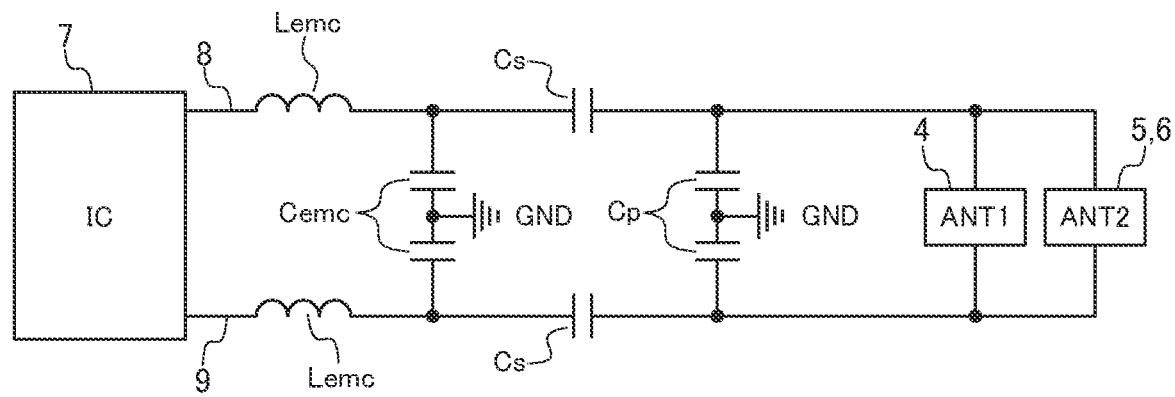
FIG. 4A is a circuit diagram illustrating an example of connection relation for the wireless communication parts 4 to 6.

FIG. 4A is a circuit diagram illustrating an example of connection relation for the wireless communication parts 4 to 6.

In the example illustrated in FIG. 4A, the antenna module 1 according to the present embodiment includes a semiconductor IC 7 for communication, and the wireless communication parts 4 to 6 are connected to a pair of signal wires 8 and 9 connected to the semiconductor IC 7. The signal wires 8 and 9 are connected with an inductor Lemc and a capacitor Cemc which function as an EMC noise filter and capacitors Cs and Cp functioning as a matching circuit. A communication antenna ANT1 constituted by the wireless communication part 4 and a communication antenna ANT2 constituted by the wireless communication parts 5 and 6 are connected in parallel to each other. Thus, even when any of the smartphone S1 of a type illustrated in FIGS. 2A to 2C or smartphone S2 of a type illustrated in FIGS. 3A to 3C is placed on the placement surface 3 of the housing 2, wireless communication can be properly performed. Further, since the communication antenna ANT1 constituted by the wireless communication part 4 and the communication antenna ANT2 constituted by the wireless communication parts 5 and 6 are connected in parallel to each other, they can be made to function independently. This allows one of the communication antennas ANT1 and ANT2 to be removed depending on a product specification.

Figure 4B:
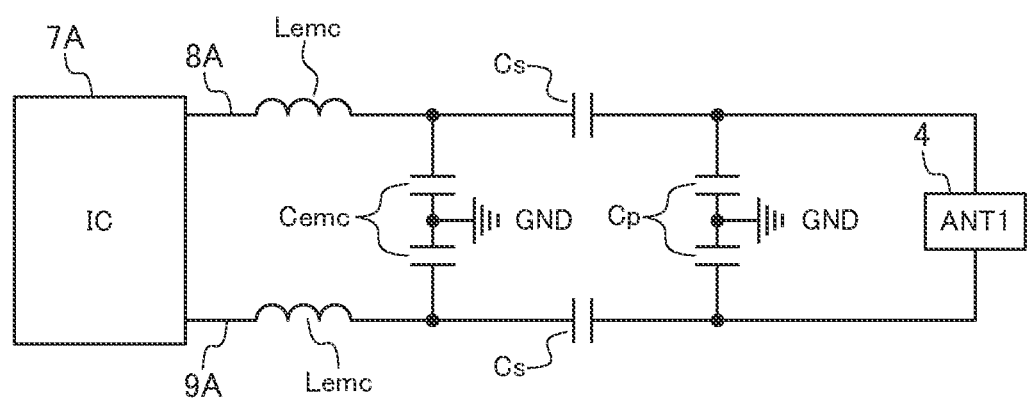
FIG. 4B is a circuit diagram illustrating another example of connection relation for the wireless communication parts 4 to 6.
Figure 4B:
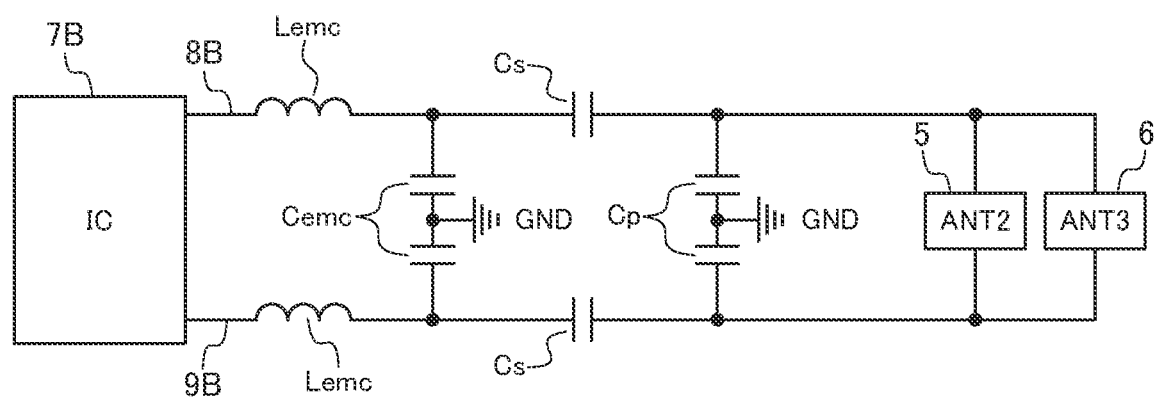

FIG. 4B is a circuit diagram illustrating another example of connection relation for the wireless communication parts 4 to 6.

In the example illustrated in FIG. 4B, the antenna module 1 according to the present embodiment includes two semiconductor ICs 7A and 7B for communication. Signal wires 8A and 9A connected to the semiconductor IC 7A are connected with an inductor Lemc and a capacitor Cemc which function as an EMC noise filter and capacitors Cs and Cp functioning as a matching circuit, and a communication antenna ANT1 constituted by the wireless communication part 4. On the other hand, a signal wires 8B and 9B connected to the semiconductor IC 7B are connected with an inductor Lemc and a capacitor Cemc which function as an EMC noise filter and capacitors Cs and Cp functioning as a matching circuit, and on this semiconductor IC 7B side, communication antennas ANT 2 and ANT 3 constituted respectively by the wireless communication parts 5 and 6 are connected in parallel to each other. As described above, the wireless communication part 4 and wireless communication parts 5 and 6 may be connected to different semiconductor ICs. This allows the wireless communication part 4 and wireless communication parts 5 and 6 to be designed independently. Further, since the communication antennas ANT 2 and ANT 3 constituted respectively by the wireless communication parts 5 and 6 are connected in parallel to each other, they can be made to function independently. This allows one of the communication antennas ANT2 and ANT3 to be removed depending on a product specification.

The wireless communication part 4 includes not only the antenna coil for NEC but also the power transmission coil for wireless power transmission, so that a magnetic sheet 30 is provided on the side opposite to the placement surface 3 with respect to the second substrate 20 so as to achieve high power transmission efficiency. Such a magnetic sheet is not provided for the wireless communication parts 5 and 6 since the wireless communication parts 5 and 6 each do not include a power transmission coil for wireless power transmission. Thus, the height position in the z-direction of the antenna coil included in each of the wireless communication parts 5 and 6 is lower than the height position in the z-direction of the antenna coil included in the wireless communication part 4 at least by the thickness of the magnetic sheet 30 in the z-direction. In order to achieve high power transmission efficiency, it is necessary to ensure a sufficient thickness of the magnetic sheet 30 in the z-direction. In the example illustrated in FIG. 1B, the thickness of the magnetic sheet 30 in the z-direction is larger than the thickness of each of the wireless communication parts 5 and 6. As a result, the height position in the z-direction of the antenna coil included in each of the wireless communication parts 5 and 6 is lower than the height position of the surface of the magnetic sheet 30 that faces the power transmission coil on the second substrate 20. This makes interference between the wireless communication part 4 and the wireless communication parts 5 and 6 less likely to occur, facilitating impedance matching in each of the wireless communication parts 4 to 6. The wireless communication parts 5 and 6 may each be provided with a magnetic sheet suitable for NFC. In this case, the magnetic sheet for each of the wireless communication parts 5 and 6 is smaller in thickness than the magnetic sheet 30 provided for the wireless communication part 4. Thus, even when the wireless communication parts 5 and 6 are each provided with a magnetic sheet, the height position in the z-direction of the antenna coil included in each of the wireless communication parts 5 and 6 is lower than the height position in the z-direction of antenna coil included in the wireless communication part 4 and the height position of the surface of the magnetic sheet 30 that faces the power transmission coil on the second substrate 20.

Figure 5:
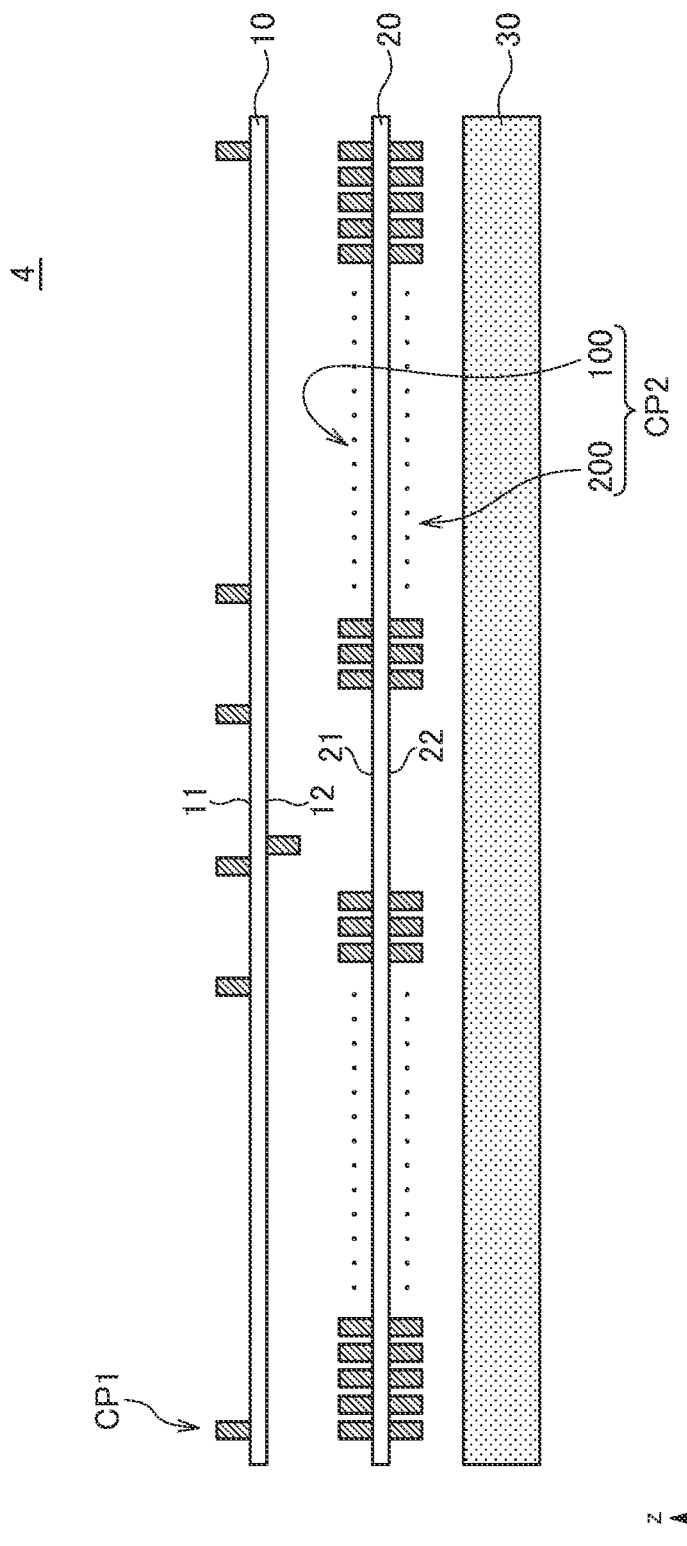
FIG. 5 is a schematic cross-sectional view for explaining the structure of the wireless communication part 4.

FIG. 5 is a schematic cross-sectional view for explaining the structure of the wireless communication part 4.

As illustrated in FIG. 5, the wireless communication part 4 includes the first and second substrates 10 and 20 made of a PET (Polyethylene Terephthalate) film or the like, a first coil pattern CP1 which is a conductor pattern made of a good conductor such as Cu and provided on one surface 11 and the other surface 12 of the first substrate 10, a second coil pattern CP2 which is a conductor pattern made of a good conductor such as Cu and provided on one surface 21 and the other surface 22 of the second substrate 20, and the magnetic sheet 30. The first coil pattern CP1 is an antenna coil for NFC (Near Field communication), and the second coil pattern CP2 is a power transmission coil for wireless power transmission. The first and second coil patterns CP1 and CP2 overlap each other in the coil axis direction. The coil axis direction of each of the first and second coil patterns CP1 and CP2 is the z-direction, and the first substrate 10, second substrate 20, and magnetic sheet 30 are arranged in this order in an overlapping manner. Specifically, the second substrate 20 is disposed between the first substrate 10 and the magnetic sheet 30, and the distance between the magnetic sheet 30 and the first substrate 10 in the z-direction is larger than the distance between the magnetic sheet 30 and the second substrate 20 in the z-direction.

Figure 6:
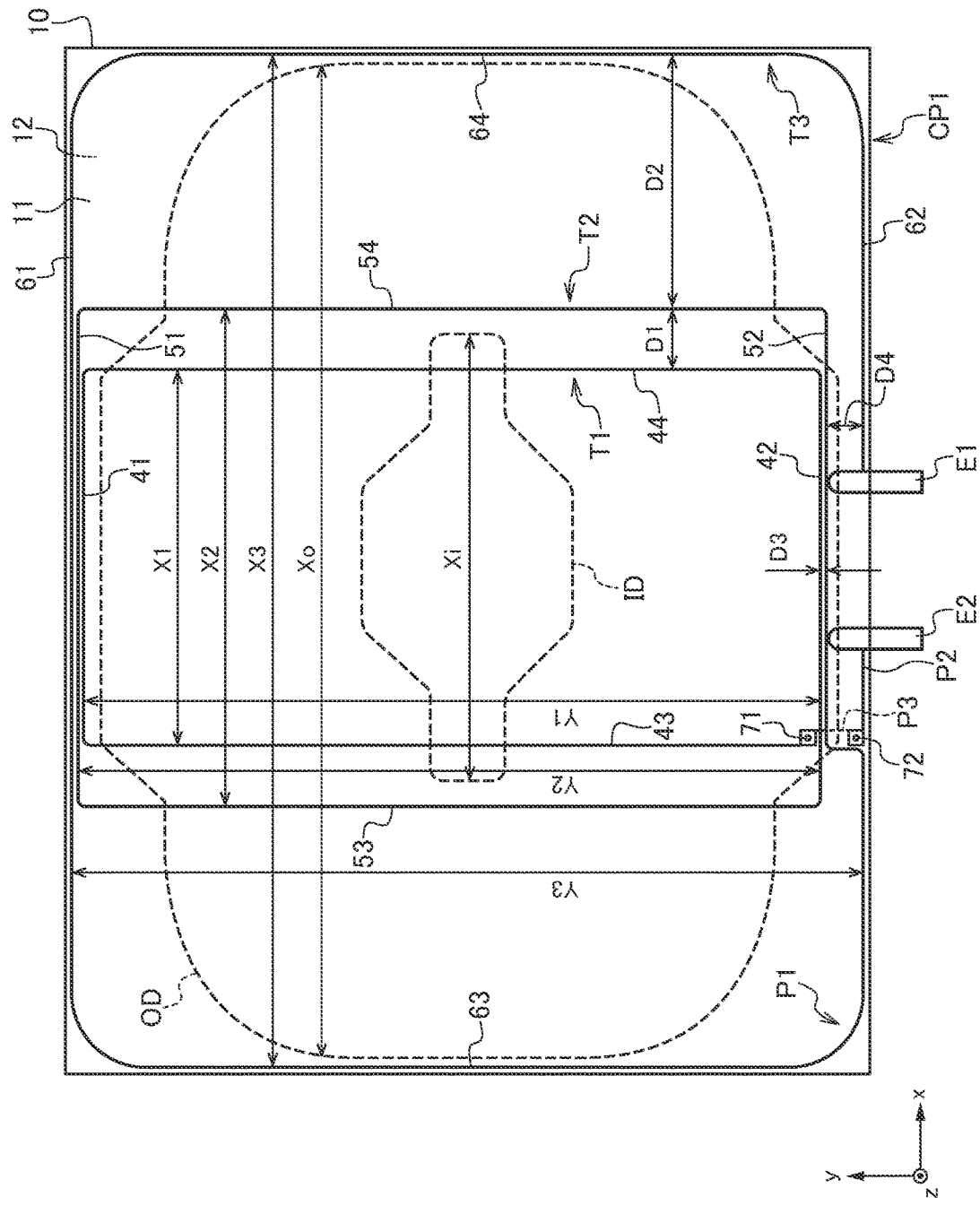
FIG. 6 is a schematic plan view illustrating the pattern shape of the first coil pattern CP1.

FIG. 6 is a schematic plan view illustrating the pattern shape of the first coil pattern CP1.

As illustrated in FIG. 6, conductor patterns P1 and P2 are formed on one surface 11 of the first substrate 10, and a conductor pattern P3 is formed on the other surface 12 of the first substrate 10. The conductor patterns P1 to P3 constitute the first coil pattern CP1. One end of the conductor pattern P1 is connected to a terminal electrode E1, and the other end of the conductor pattern P1 is connected to one end of the conductor pattern P3 through a via conductor 71 penetrating the first substrate 10. One end of the conductor pattern P2 is connected to a terminal electrode E2, and the other end of the conductor pattern P2 is connected to the other end of the conductor pattern P3 through a via conductor 72 penetrating the first substrate 10.

The first coil pattern CP1 constituted by the conductor patterns P1 to P3 includes first, second, and third turns T1, T2, and T3 wound in a substantially rectangular shape. The first turn T1 is positioned in the opening of the second turn T2, and the second turn T2 is positioned in the opening of the third turn T3. The first turn T1 is the innermost turn of the first coil pattern CP1. The opening width of the first turn T1 in the y-direction is Y1, and that in the x-direction is X1. The y-direction is, for example, a first direction, and the x-direction is, for example, a second direction. The second turn T2 is positioned outside the first turn T1. The opening width of the second turn T2 in the y-direction is Y2 and is larger than the opening width Y1 of the first turn T1 (Y2>Y1), and the opening width of the second turn T2 in the x-direction is X2 and is larger than the opening width X1 of the first turn T1 (X2>X1). The third turn T3 is positioned outside the second turn T2. The opening width of the third turn T3 in the y-direction is Y3 and is larger than the opening width Y2 of the second turn T2 (Y3>Y2), and the opening width of the third turn T3 in the x-direction is X3 and is larger than the opening width X2 of the second turn T2 (X3>X2).

The opening width Y1 of the first turn T1 in the y-direction is larger than the opening width X1 in the x-direction (Y1>X1). Similarly, the opening width Y2 of the second turn T2 in the y-direction is larger than the opening width X2 in the x-direction (Y2>X2). On the other hand, the opening width Y3 of the third turn T3 in the y-direction is smaller than the opening width X3 in the x-direction (Y3<X3). That is, when the x- and y-directions are defined as the horizontal and vertical directions, respectively, the first and second turns T1 and T2 each have a vertically long rectangular shape, while the third turn T3 has a horizontally long rectangular shape. Assuming that the terminal electrodes E1 and E2 are the start and end points, respectively, the first coil pattern CP1 is wound proceeding in the following order: a part of the third turn T3→second turn T2→first turn T1→the remaining part of the third turn T3. The third turn T3 includes the conductor pattern P3 formed on the surface 12 of the first substrate 10. On the other hand, the first and second turns T1 and T2 are entirely constituted by the conductor pattern P1 formed on the surface 11 of the first substrate 10.

The first turn T1 has sections 41 and 42 extending in the x-direction and sections 43 and 44 extending in the y-direction. The sections 41 and 42 linearly extend in the x-direction, and the sections 43 and 44 linearly extend in the y-direction. Thus, the first turn T1 has a substantially rectangular planar shape with rounded corner portions. The second turn T2 has sections 51 and 52 extending in the x-direction and sections 53 and 54 extending in the y-direction. The sections 51 and 52 linearly extend in the x-direction, and the sections 53 and 54 linearly extend in the y-direction. Thus, the second turn T2 has a substantially rectangular planar shape with rounded corner portions. The third turn T3 has sections 61 and 62 extending in the x-direction and sections 63 and 64 extending in the y-direction. The sections 61 and 62 linearly extend in the x-direction, and the sections 63 and 64 linearly extend in the y-direction. Thus, the third turn T3 has a substantially rectangular planar shape with rounded corner portions.

When a first distance between the sections 43, 44 of the first turn T1 and the sections 53, 54 of the second turn T2 in the x-direction is defined as D1, and a second distance between the sections 53, 54 of the second turn T2 and the sections 63, 64 of the third turn T3 in the x-direction is defined as D2, the first distance D1 is smaller than the second distance D2 (D1<D2). That is, the first and second turns T1 and T2 each have a vertically long rectangular shape, and the difference between the opening widths X1 and X2 thereof in the x-direction is small, while the third turn T3 has a horizontally long rectangular shape, and the difference between the opening width X3 thereof in the x-direction and the opening width X2 of the second turn T2 in the x-direction is large.

Further, when a third distance between the sections 41, 42 of the first turn T1 and the sections 51, 52 of the second turn T2 in the y-direction is defined as D3, the third distance D3 is smaller than the first distance D1 (D1>D3). That is, the first and second turns T1 and T2 each have a vertically long rectangular shape, and the difference between the opening widths X1 and X2 thereof in the x-direction is small, and the difference between the opening widths Y1 and Y2 thereof in the y-direction is smaller than the small difference between the opening widths X1 and X2.

Further, when a fourth distance between the sections 51, 52 of the second turn T2 and the sections 61, 62 of the third turn T3 in the y-direction is defined as D4, the fourth distance D4 is smaller than the second distance D2 (D2>D4). That is, the second and third turns T2 and T3 have a vertically long rectangular shape and a horizontally long rectangular shape, respectively, and the difference between the opening widths Y2 and Y3 thereof in the y-direction is smaller than the distance between the opening widths X2 and X3 thereof in the x-direction. The section 52 of the second turn T2 is disposed slightly inward so as not to interfere with the terminal electrodes E1 and E2, so that the difference between the section 52 of the second turn T2 and the section 62 of the third turn T3 is larger than the difference between the section 51 of the second turn T2 and the section 61 of the third turn T3. However, the fourth distance D4 is smaller than the second distance D2 in both the cases where it is defined as the difference between the section 52 of the second turn T2 and the section 62 of the third turn T3 and the difference between the section 51 of the second turn T2 and the section 61 of the third turn T3.

As described above, the first coil pattern CP1 functioning as an antenna coil has such a configuration that the first and second turns T1 and T2 each have a vertically long rectangular shape and the third turn T3 has a horizontally long rectangular shape and that the first distance D1 is smaller than the second distance D2, so that the communicable range in the x-direction is extended while improving communication characteristics when the smartphone S1 is positioned at the center of the placement surface 3 in the x-direction as illustrated in FIG. 2A. This allows communication to be performed even when the position of the smartphone S1 on the placement surface 3 is offset in the x-direction as illustrated in FIGS. 2B and 2C. In addition, since the third distance D3 is smaller than the first distance D1, and the fourth distance D4 is smaller than the second distance D2, the first coil pattern CP1 can have a sufficient opening width in the y-direction. Thus, even when the smartphone S1 is offset in the y-direction, communication can be performed satisfactorily.

Figure 7:
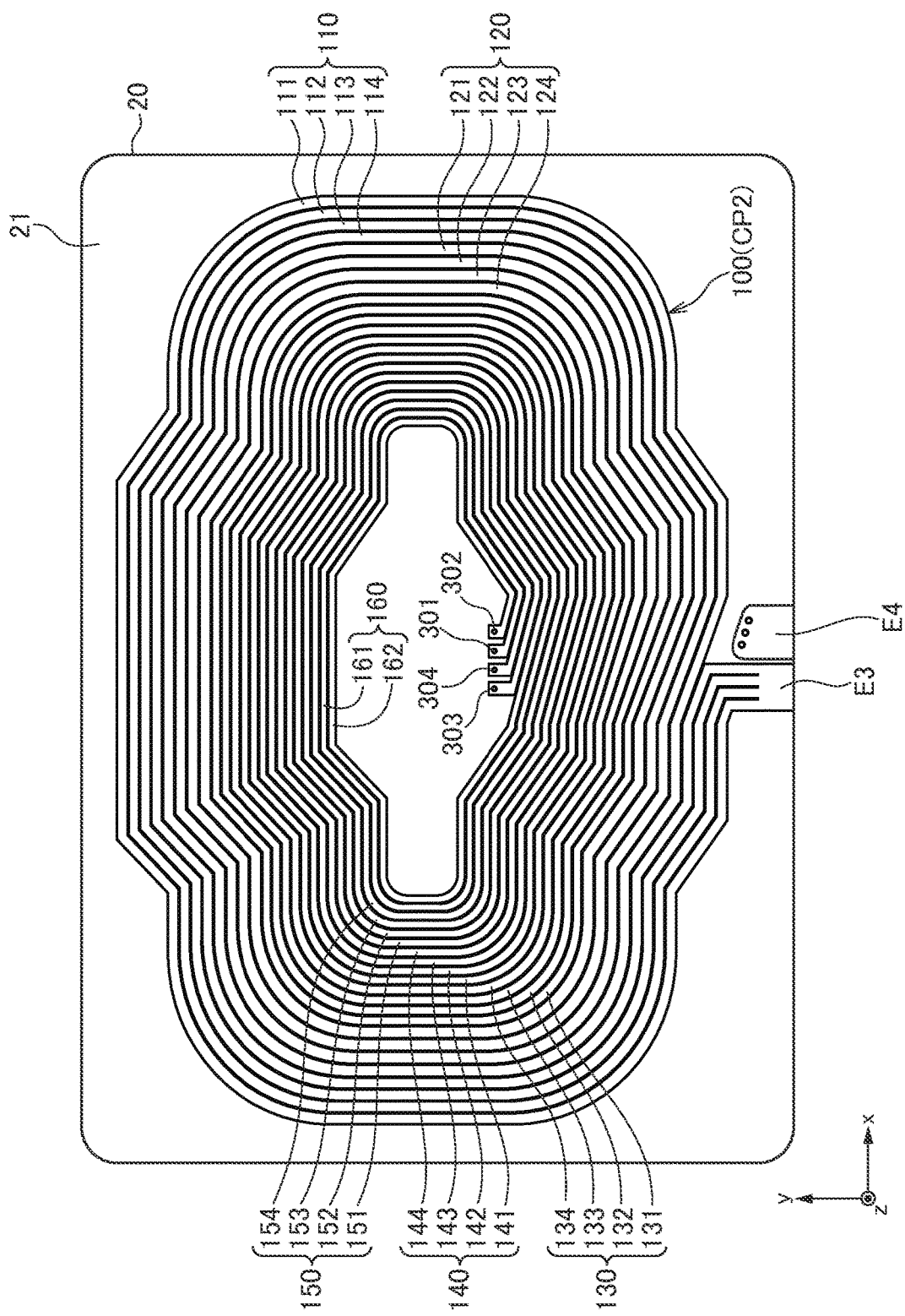
FIG. 7 is a schematic plan view illustrating the pattern shape of a conductor pattern formed on the surface 21 of the second substrate 20.

FIG. 7 is a schematic plan view illustrating the pattern shape of a conductor pattern formed on the surface 21 of the second substrate 20.

As illustrated in FIG. 7, a spiral conductor pattern 100 constituting the second coil pattern CP2 is formed on the surface 21 of the second substrate 20.

The conductor pattern 100 constituting the second coil pattern CP2 has a six-turn configuration including turns 110, 120, 130, 140, 150, and 160, in which the turns 110 and 160 are positioned at the outermost and innermost peripheries, respectively. The turns 110, 120, 130, 140, and 150 are each radially divided into four by three spiral slits. The turn 160 is radially divided into two by one spiral slit. Specifically, the turn 110 is divided into four lines 111 to 114, the turn 120 is divided into four lines 121 to 124, the turn 130 is divided into four lines 131 to 134, the turn 140 is divided into four lines 141 to 144, the turn 150 is divided into four lines 151 to 154, and the turn 160 is divided into two lines 161 and 162.

The lines 111, 121, 131, 141, 151, and 161 are continuous lines spirally wound in six turns and are each positioned at the outermost periphery in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the second line counted from the innermost peripheral line in its corresponding turn. The lines 114, 124, 134, 144, and 154 are continuous lines spirally wound in five turns and are each positioned at the innermost periphery in its corresponding turn.

The outer peripheral ends of the lines 111 to 114 are connected in common to a terminal electrode E3. The inner peripheral ends of the lines 161, 162, 153, and 154 are connected respectively to through hole conductors 301 to 304 penetrating the second substrate 20.

Figure 8:
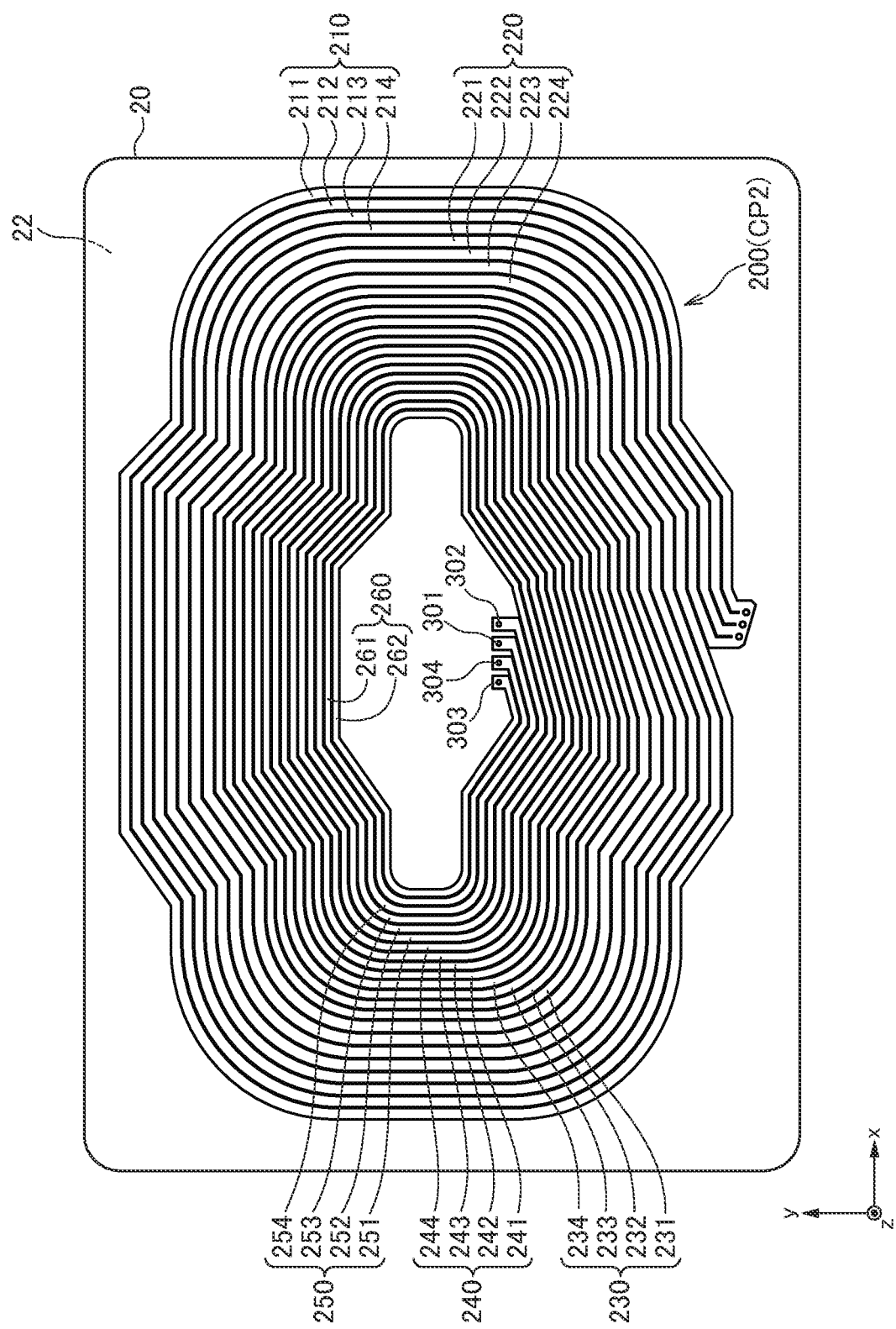
FIG. 8 is a schematic plan view illustrating the pattern shape of a conductor pattern formed on the surface 22 of the second substrate 20.

FIG. 8 is a schematic plan view illustrating the pattern shape of a conductor pattern formed on the surface 22 of the second substrate 20, which illustrates a state viewed from the surface 21 side of the second substrate 20 transparently through the second substrate 20.

As illustrated in FIG. 8, a spiral conductor pattern 200 constituting the second coil pattern CP2 is formed on the other surface 22 of the second substrate 20. In the present embodiment, the surface 22 of the second substrate faces the magnetic sheet 30; however, the second substrate 20 may be disposed such that the surface 21 of the second substrate 20 faces the magnetic sheet 30.

The pattern shape of the main part of the conductor pattern 200 constituting the second coil pattern CP2 is the same as the pattern shape of the conductor pattern 100. The second coil pattern CP2 has a six-turn configuration including turns 210, 220, 230, 240, 250, and 260, in which the turn 210 and turn 260 are positioned at the outermost and innermost peripheries, respectively. The turns 210, 220, 230, 240, and 250 are each radially divided into four by three spiral slits. The turn 260 is radially divided into two by one spiral slit. Specifically, the turn 210 is divided into four lines 211 to 214, the turn 220 is divided into four lines 221 to 224, the turn 230 is divided into four lines 231 to 234, the turn 240 is divided into four lines 241 to 244, the turn 250 is divided into four lines 251 to 254, and the turn 260 is divided into two lines 261 and 262.

The lines 211, 221, 231, 241, 251, and 261 are continuous lines spirally wound in six turns and are each positioned at the outermost periphery in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the second line counted from the innermost peripheral line in its corresponding turn. The lines 214, 224, 234, 244, and 254 are continuous lines spirally wound in five turns and are each positioned at the innermost periphery in its corresponding turn.

The outer peripheral ends of the lines 211 to 214 are connected in common to a terminal electrode E4 through a through hole conductor. The inner peripheral ends of the lines 261, 262, 253, and 254 are connected respectively to through hole conductors 304, 303, 302, and 301. As a result, four lines each having 11 turns are connected in parallel between the terminal electrodes E3 and E4.

FIG. 6 illustrates the planar positional relation between the first and second coil patterns CP1 and CP2 in a state where the first and second substrates 10 and 20 overlap each other. In FIG. 6, an inner shape ID defined by the innermost peripheral turn of the second coil pattern CP2 and an outer shape OD defined by the outermost peripheral turn of the second coil pattern CP2 are denoted by dashed lines. The area between the inner shape ID and the outer shape OD is a coil area where a plurality of lines constituting the second coil pattern CP2 are disposed, and the radial width thereof corresponds to the winding width of the second coil pattern CP2.

As illustrated in FIG. 6, the second coil pattern CP2 is made to overlap the first coil pattern CP1 such that the y- and x-directions thereof are the short side direction and the long side direction, respectively. Thus, as in communication using the first coil pattern CP1, wireless power transmission can be performed efficiently even when the position of the smartphone S1 or S2 on the placement surface 3 is offset in the x-direction as illustrated in FIGS. 2B, 2C or FIGS. 3B, 3C.

Further, as illustrated in FIG. 6, an opening width Xi in the x-direction of the inner shape ID of the second coil pattern CP2 is larger than the opening width X1 in the x-direction of the first turn T1 of the first coil pattern CP1 and smaller than the opening width X2 in the x-direction of the second turn T2 of the first coil pattern CP1. On the other hand, an opening width Xo in the x-direction of the outer shape OD of the coil pattern CP2 is larger than the opening width X2 in the x-direction of the second turn T2 of the first coil pattern CP1 and substantially the same as or slightly smaller than the opening width X3 in the x-direction of the third turn T3 of the first coil pattern CP1.

Figure 9:
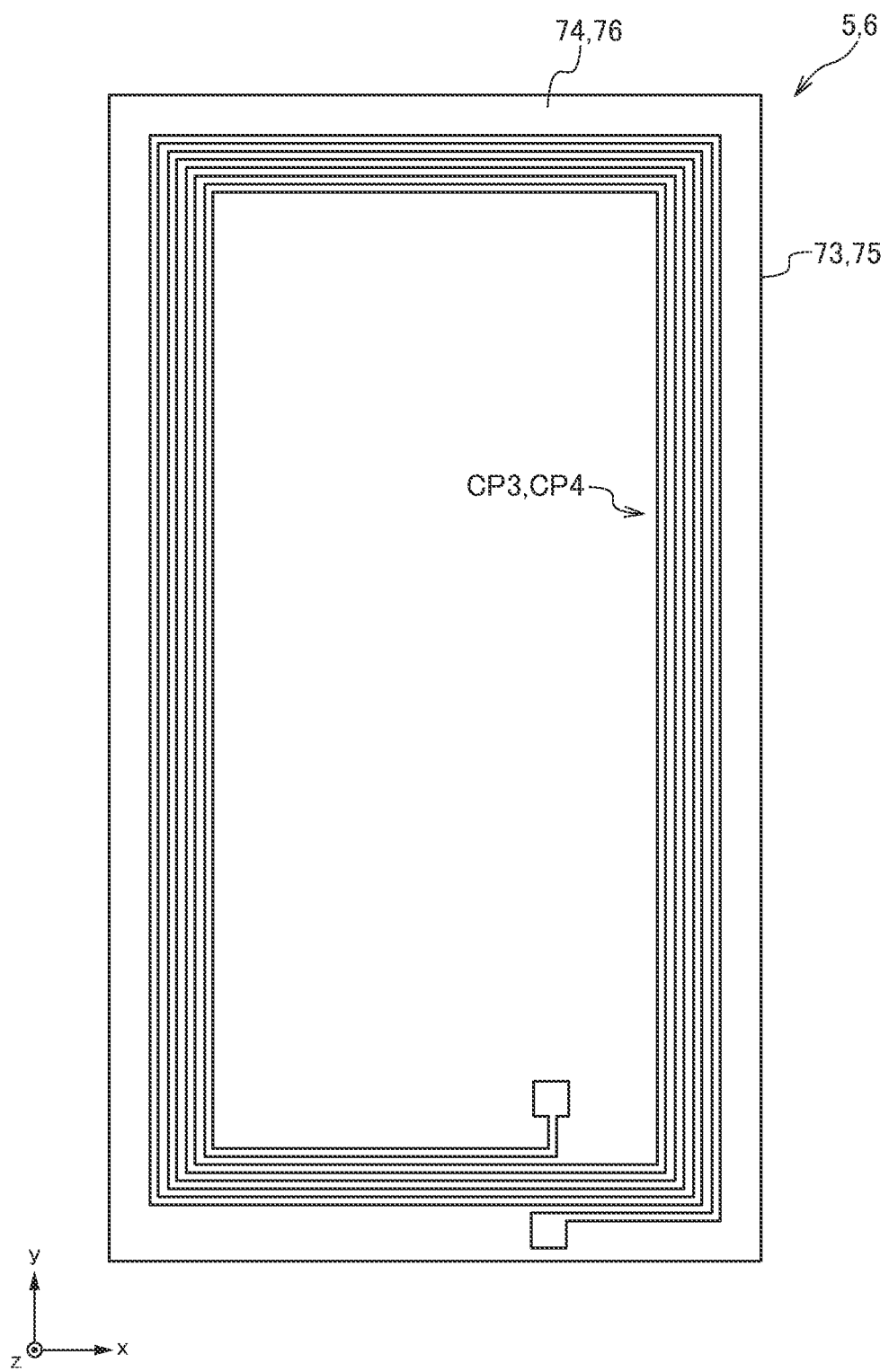
FIG. 9 is a schematic cross-sectional view for explaining the structures of the wireless communication parts 5 and 6.

FIG. 9 is a schematic cross-sectional view for explaining the structures of the wireless communication parts 5 and 6.

As illustrated in FIG. 9, the wireless communication part 5 is constituted by a third substrate 73 made of a PET film and a third coil pattern CP3 formed on one surface 74 of the third substrate 73. The wireless communication part 6 is constituted by a fourth substrate 75 made of a PET film and a fourth coil pattern CP4 formed on one surface 76 of the fourth substrate 75. The third and fourth coil patterns CP3 and CP4 are each an antenna coil for NFC. The third and fourth coil patterns CP3 and CP4 may have the same pattern shape. The third and fourth coil patterns CP3 and CP4 are each a planar spiral coil pattern wound in a plurality of turns, and the outer shape and the opening each thereof has a rectangular shape having a short side in the x-direction and a long side in the y-direction. In the example illustrated in FIG. 9, the number of turns of each of the third and fourth coil patterns CP3 and CP4 is four, but not limited thereto. Further, the planar shape of each of the third and fourth coil patterns CP3 and CP4 is not limited to a rectangular shape and may be a circular or elliptic shape.

Figure 10:
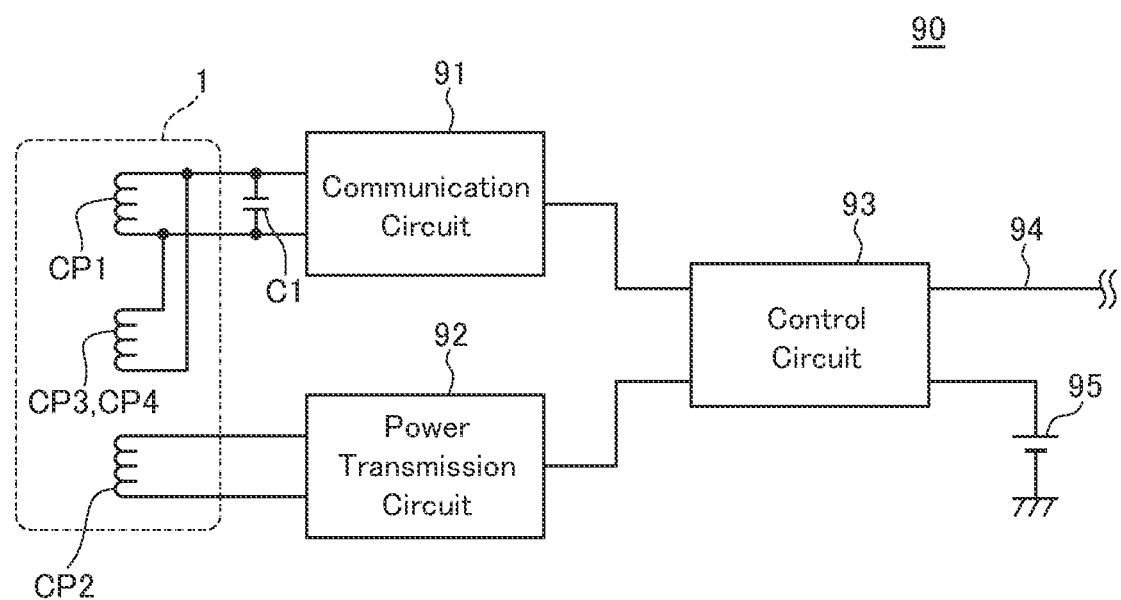
FIG. 10 is a block diagram of a wireless power transmission device 90 using the antenna module 1 according to the present embodiment.

FIG. 10 is a block diagram of a wireless power transmission device 90 using the antenna module 1 according to the present embodiment.

The wireless power transmission device 90 illustrated in FIG. 10 includes the antenna module 1 having the first to fourth coil patterns CP1 to CP4, a communication circuit 91 connected to the first, third, and fourth coil patterns CP1, CP3, and CP4, and a power transmission circuit 92 connected to the second coil pattern CP2. A capacitor C1 is connected between the communication circuit 91 and the first, third, and fourth coil patterns CP1, CP3, and CP4. The communication circuit 91 and power transmission circuit 92 are connected to a control circuit 93. With this configuration, data to be exchanged through a communication line 94 can be communicated through the first, third, and fourth coil patterns CP1, CP3, and CP4 for NFC, and the power to be supplied from a power supply 95 can be wirelessly transmitted through the second coil pattern CP2 for wireless power transmission.

Figure 11:
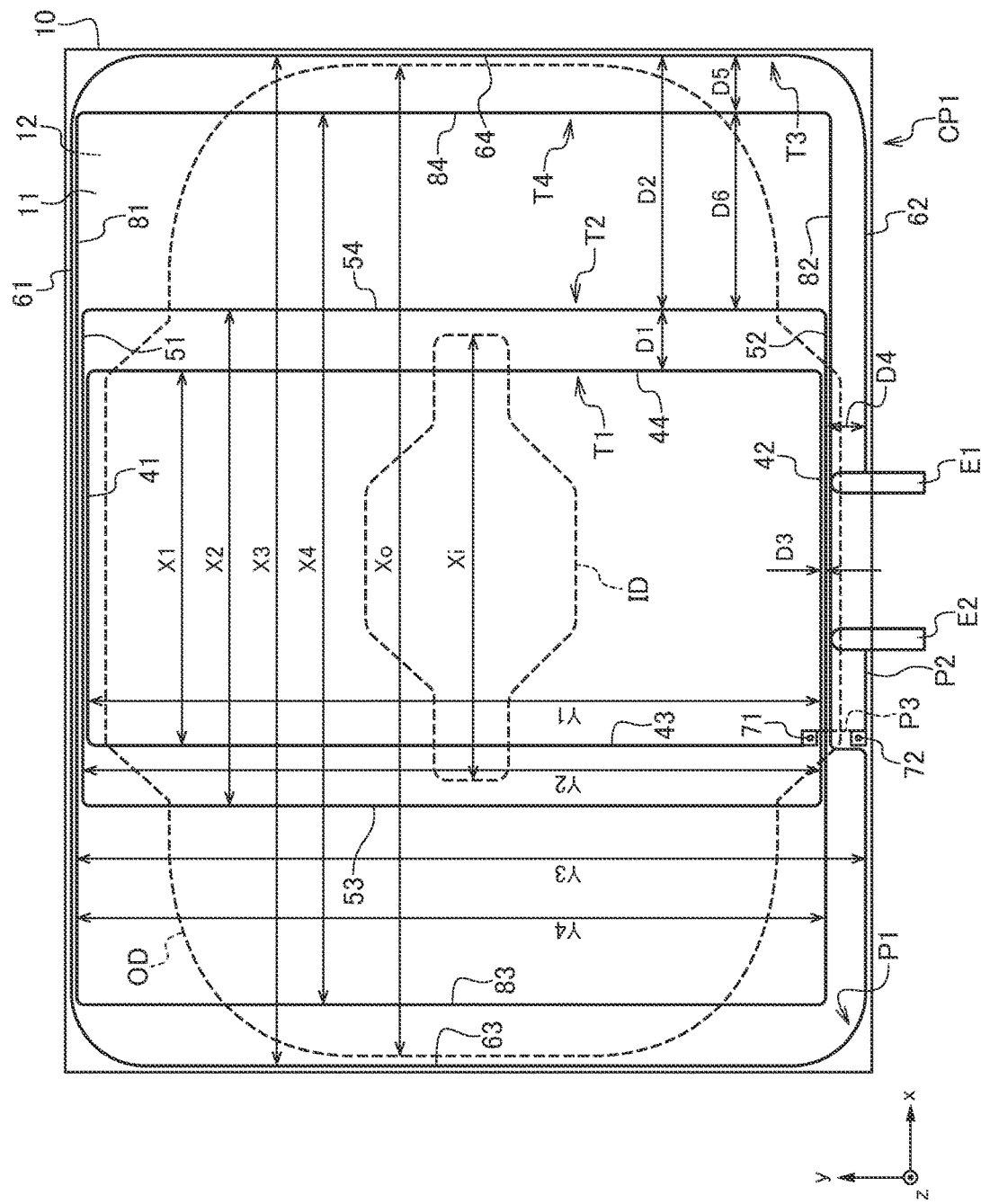
FIG. 11 is a schematic plan view illustrating the pattern shape of the first coil pattern CP1 according to a first modification.

FIG. 11 is a schematic plan view illustrating the pattern shape of the first coil pattern CP1 according to a first modification.

The first coil pattern CP1 according to the first modification illustrated in FIG. 11 differs from the first coil pattern CP1 illustrated in FIG. 6 in that it further includes a fourth turn T4 which is a part of the conductor pattern P1 that is wound in a rectangular shape on the surface 11 of the first substrate 10. Other configurations are basically the same as those of the first coil pattern CP1 illustrated in FIG. 6, so the same reference numerals are given to the same elements, and overlapping description will be omitted.

The fourth turn T4 is disposed between the second and third turns T2 and T3. Assuming that the terminal electrodes E1 and E2 are the start and end points, respectively, the first coil pattern CP1 is wound proceeding in the following order: a part of the third turn T3→fourth turn T4→second turn T2→first turn T1→the remaining part of the third turn T3. The opening width of the fourth turn T4 in the x-direction is X4, and that in the y-direction is Y4. The opening width X4 is smaller than the opening width X3 of the third turn T3 and larger than the opening width X2 of the second turn T2 (X3>X4>X2). The opening width Y4 is smaller than the opening width Y3 of the third turn T3 and larger than the opening width Y2 of the second turn T2 (Y3>Y4>Y2). The opening width Y4 of the fourth turn T4 in the y-direction is smaller than the opening width X4 thereof in the x-direction (Y4<X4). That is, when the x- and y-directions are defined as the horizontal and vertical directions, respectively, the fourth turn T4 has a horizontally long rectangular shape like the third turn T3.

The fourth turn T4 has sections 81 and 82 extending in the x-direction and sections 83 and 84 extending in the y-direction. The sections 81 and 82 linearly extend in the x-direction, and the sections 83 and 84 linearly extend in the y-direction. Thus, the fourth turn T4 has a substantially rectangular planar shape with rounded corner portions. When a fifth distance D5 between the sections 83, 84 of the fourth turn T4 and the sections 63, 64 of the third turn T3 in the x-direction is defined as D5, and a sixth distance between the sections 83, 84 of the fourth turn T4 and the sections 53, 54 of the second turn T2 in the x-direction is defined as D6, the fifth distance D5 is smaller than the sixth distance D6 (D5<D6). That is, the third and fourth turns T3 and T4 each have a horizontally long rectangular shape, and the difference between the opening widths X3 and X4 thereof in the x-direction is small.

Using the thus configured first coil pattern CP1 increases inductance to thereby improve communication characteristics. Further, the sections 83 and 84 of the fourth turn T4 are disposed in the vicinity of the sections 63 and 64 of the third turn T3, so that it is possible to significantly improve communication characteristics when the position of the smartphone S1 on the placement surface 3 is offset in the x-direction as illustrated in FIGS. 2B and 2C.

Figure 12:
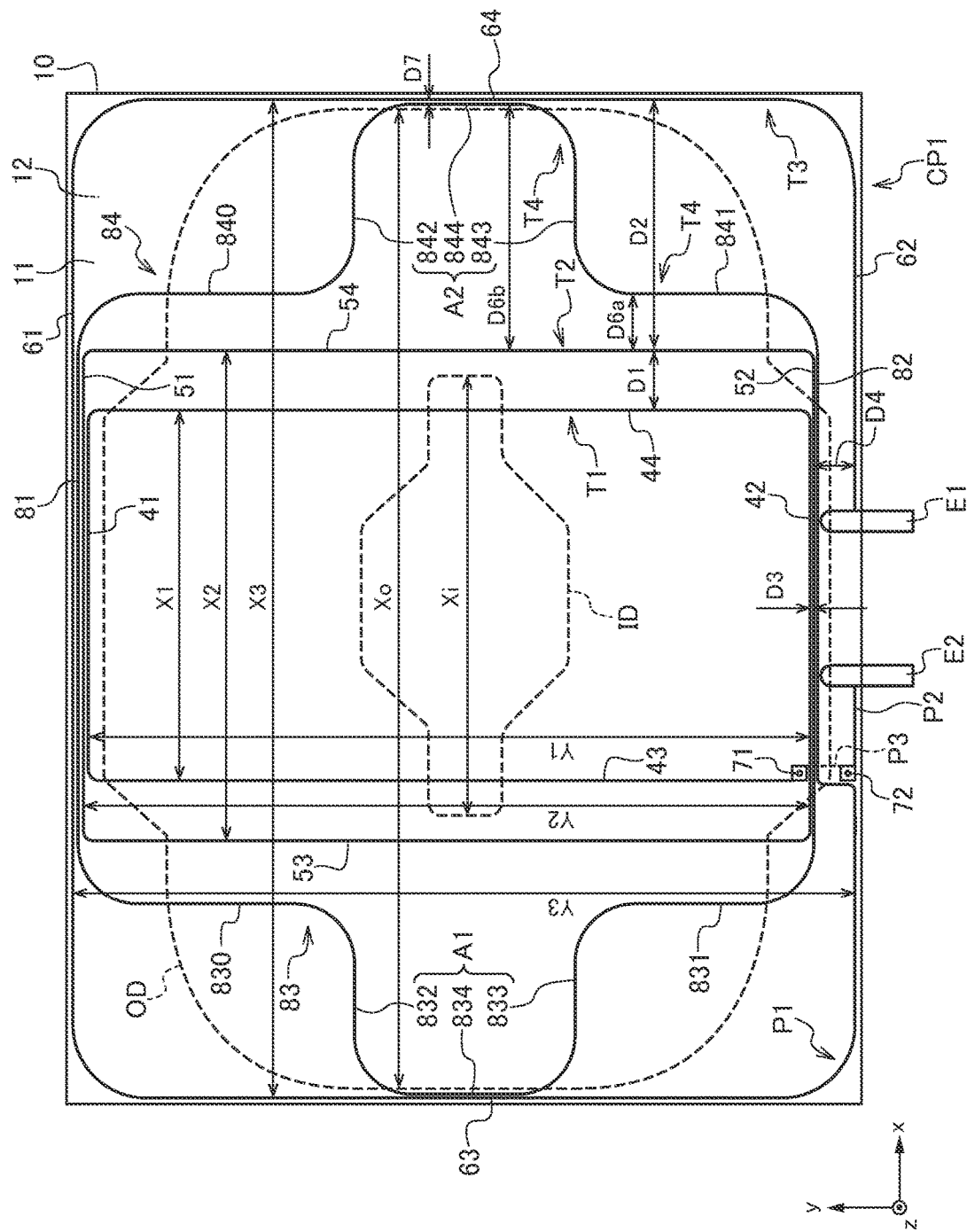
FIG. 12 is a schematic plan view illustrating the pattern shape of the first coil pattern CP1 according to a second modification.

FIG. 12 is a schematic plan view illustrating the pattern shape of the first coil pattern CP1 according to a second modification.

The first coil pattern CP1 according to the second modification illustrated in FIG. 12 differs from the first coil pattern CP1 illustrated in FIG. 11 in the planar shape of the fourth turn T4. Other configurations are basically the same as those of the first coil pattern CP1 illustrated in FIG. 11, so the same reference numerals are given to the same elements, and overlapping description will be omitted.

In the second modification, the sections 81 and 82 of the fourth turn T4 each linearly extend in the x-direction, while the sections 83 and 84 each have a section shifting in position in the x-direction. Specifically, the section 83 has a straight line sections 830 and 831 linearly extending in the y-direction and a protruding section A1 positioned between the straight line sections 830 and 831 and bulging outside in the x-direction. The protruding section A1 has a second straight line section 832 connected to the straight line section 830 and linearly extending in the x-direction, a third straight line section 833 connected to the straight line section 831 and linearly extending in the x-direction, and a first straight line section 834 connecting the second and third straight line sections 832 and 833 and extending in the y-direction. Similarly, the section 84 has straight line sections 840 and 841 linearly extending in the y-direction and a protruding section A2 positioned between the straight line sections 840 and 841 and bulging outside in the x-direction. The protruding section A2 has a second straight line section 842 connected to the straight line section 840 and linearly extending in the x-direction, a third straight line section 843 connected to the straight line section 841 and linearly extending in the x-direction, and a first straight line section 844 connecting the second and third straight line sections 842 and 843 and extending in the y-direction.

With the above configuration, a distance D6b in the x-direction between the section 53 (54) of the second turn T2 and the first straight line section 834 (844) of the fourth turn T4 is larger than a distance D6a in the x-direction between the section 53 (54) of the second turn T2 and the straight line sections 830, 831 (840, 841) of the fourth turn T4 (D6b>D6a). Further, when a seventh distance in the x-direction between the first straight line section 834 (844) of the protruding section A1 (A2) and the section 63 (64) of the third turn T3 extending in the y-direction is defined as D7, the seventh distance D7 is smaller than the first distance D1.

Using the thus configured first coil pattern CP1 allows communication to be properly performed even when the position of an antenna coil as a communication target is displaced from the center in the y-direction. This allows communication with an antenna coil RX1 incorporated in the smartphone S1. Further, when an IC card having a wireless communication function is provided between the placement surface 3 of the housing 2 and the smartphone S1, detection of the IC card becomes possible. When the IC card is actually detected, wireless power transmission using the second coil pattern CP2 is stopped, whereby breakage of the IC card can be prevented. In addition, since the seventh distance D7 is smaller than the first distance D1, it is possible to further improve communication characteristics when the position of the smartphone S1 on the placement surface 3 is offset in the x-direction as illustrated in FIGS. 2B and 2C.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

An antenna module according to the present disclosure has a first coil pattern including at least first, second, and third turns. The first turn is positioned in the opening of the second turn, and the second turn is positioned in the opening of the third turn. The first and second turns each have an opening width larger in a first direction than in a second direction perpendicular to the first direction. A first distance between the first and second turns in the second direction is smaller than a second distance between the second and third turns in the second direction, a third distance between the first and second turns in the first direction is smaller than the first distance, and a fourth distance between the second and third turns in the first direction is smaller than the second distance. The third turn has an opening width larger in the second direction than in the first direction. With this configuration, it is possible to extend a communicable range in the second direction with a small number of turns while improving communication characteristics at substantially the center in the second direction.

The first coil pattern may further include a fourth turn positioned between the second and third turns. This increases inductance to allow improvement in communication characteristics. In this case, a fifth distance between the fourth and third turns in the second direction may be smaller than a sixth distance between the fourth and second turns in the second direction. This allows communication to be properly performed even when a communication target device is significantly offset in the second direction.

A part of the fourth turn that extends in the first direction may include a protruding section, the distance in the second direction between the second turn extends in the first direction and the fourth turn extends in the first direction increases at the protruding section. This allows communication to be properly performed even when a communication target device is offset in the first direction. In this case, the protruding section may have a first straight line section extending in the first direction and a second straight line section extending in the second direction. This makes it possible to improve communication characteristics at substantially the center in the first direction while extending a communicable range in the second direction. Further, a seventh distance in the second direction between the first straight line section of the protruding section and a part of the third turn that extends in the first direction may be smaller than the first distance. This allows further improvement in communication characteristics when a communication target device is significantly offset in the second direction.

The antenna module according to the present disclosure may further include a second coil pattern overlapping the first coil pattern as viewed in the coil axis direction of the first coil pattern. This makes it possible to perform wireless power transmission in addition to communication based on NFC technology or the like. In this case, the second coil pattern may overlap the first coil pattern such that the first and second directions thereof are the short side direction and the long side direction, respectively. This allows power transmission to be properly performed even when a charging target device is significantly offset in the second direction.

The antenna module according to the present disclosure may further include a third coil pattern disposed at one side of the first coil pattern in the second direction so as not to overlap the first coil pattern as viewed in the coil axis direction. This allows communication to be properly performed in both the cases where an antenna coil provided in a communication target device is disposed at substantially the center in the second direction and where it is disposed at the end portion in the second direction. In this case, the antenna module may further include a fourth coil pattern disposed at the other side of the first coil pattern in the second direction so as not to overlap the first coil pattern as viewed in the coil axis direction. This allows communication to be properly performed even when the antenna coil disposed at the end portion in the second direction is rotated by 180° in the second direction.

The first and third coil patterns may be connected in parallel. This allows the first and third coil patterns to function independently of each other.

The height position of the third coil pattern in the coil axis direction may be lower than the height position of the first coil pattern in the coil axis direction. This can suppress coupling between the first and third coil patterns. In this case, the antenna module may further include a magnetic sheet disposed on the side opposite to the first coil pattern with respect to the second coil pattern, and the height position of the third coil pattern in the coil axis direction may be lower than the height position of the surface of the magnetic sheet that faces the second coil pattern. This can further suppress coupling between the first and third coil patterns.

A wireless power transmission device according to the present disclosure may include the above-described antenna module, a communication circuit connected to the first coil pattern, and a power transmission circuit connected to the second coil pattern. This makes it possible to perform wireless power transmission and NFC-based communication.

What is claimed is:
1. An antenna module comprising a first coil pattern including at least first, second, and third turns,
wherein the first turn is positioned in an opening of the second turn,
wherein the second turn is positioned in an opening of the third turn,
wherein each of the first and second turns has an opening width larger in a first direction than in a second direction perpendicular to the first direction,
wherein a first distance between the first and second turns in the second direction is smaller than a second distance between the second and third turns in the second direction,
wherein a third distance between the first and second turns in the first direction is smaller than the first distance,
wherein a fourth distance between the second and third turns in the first direction is smaller than the second distance, and
wherein the third turn has an opening width larger in the second direction than in the first direction.

2. The antenna module as claimed in claim 1, wherein the first coil pattern further includes a fourth turn positioned between the second and third turns.

3. The antenna module as claimed in claim 2, wherein a fifth distance between the fourth and third turns in the second direction is smaller than a sixth distance between the fourth and second turns in the second direction.

4. The antenna module as claimed in claim 2,
wherein a part of the fourth turn that extends in the first direction includes a protruding section, and
wherein a distance in the second direction between the second turn extends in the first direction and the fourth turn extends in the first direction increases at the protruding section.

5. The antenna module as claimed in claim 4, wherein the protruding section has a first straight line section extending in the first direction and a second straight line section extending in the second direction.

6. The antenna module as claimed in claim 5, wherein a seventh distance in the second direction between the first straight line section of the protruding section and a part of the third turn that extends in the first direction is smaller than the first distance.

7. The antenna module as claimed in claim 1, further comprising a second coil pattern overlapping the first coil pattern as viewed in a coil axis direction of the first coil pattern.

8. The antenna module as claimed in claim 7, wherein the second coil pattern overlaps the first coil pattern such that the first and second directions thereof are the short side direction and the long side direction, respectively.

9. The antenna module as claimed in claim 7, further comprising a third coil pattern disposed at one side of the first coil pattern in the second direction so as not to overlap the first coil pattern as viewed in the coil axis direction.

10. The antenna module as claimed in claim 9, further comprising a fourth coil pattern disposed at another side of the first coil pattern in the second direction so as not to overlap the first coil pattern as viewed in the coil axis direction.

11. The antenna module as claimed in claim 9, wherein the first and third coil patterns are connected in parallel.

12. The antenna module as claimed in claim 9, wherein a height position of the third coil pattern in the coil axis direction is lower than a height position of the first coil pattern in the coil axis direction.

13. The antenna module as claimed in claim 12, further comprising a magnetic sheet disposed on a side opposite to the first coil pattern with respect to the second coil pattern,
wherein a height position of the third coil pattern in the coil axis direction is lower than a height position of a surface of the magnetic sheet that faces the second coil pattern.

14. A wireless power transmission device comprising:
an antenna module comprising a first coil pattern and a second coil pattern overlapping the first coil pattern as viewed in a coil axis direction of the first coil pattern;
a communication circuit connected to the first coil pattern; and
a power transmission circuit connected to the second coil pattern,
wherein the first coil pattern includes at least first, second, and third turns,
wherein the first turn is positioned in an opening of the second turn,
wherein the second turn is positioned in an opening of the third turn,
wherein each of the first and second turns has an opening width larger in a first direction than in a second direction perpendicular to the first direction, wherein a first distance between the first and second turns in the second direction is smaller than a second distance between the second and third turns in the second direction, wherein a third distance between the first and second turns in the first direction is smaller than the first distance, wherein a fourth distance between the second and third turns in the first direction is smaller than the second distance, and wherein the third turn has an opening width larger in the second direction than in the first direction.

\* \* \* \* \*